Figure 1:
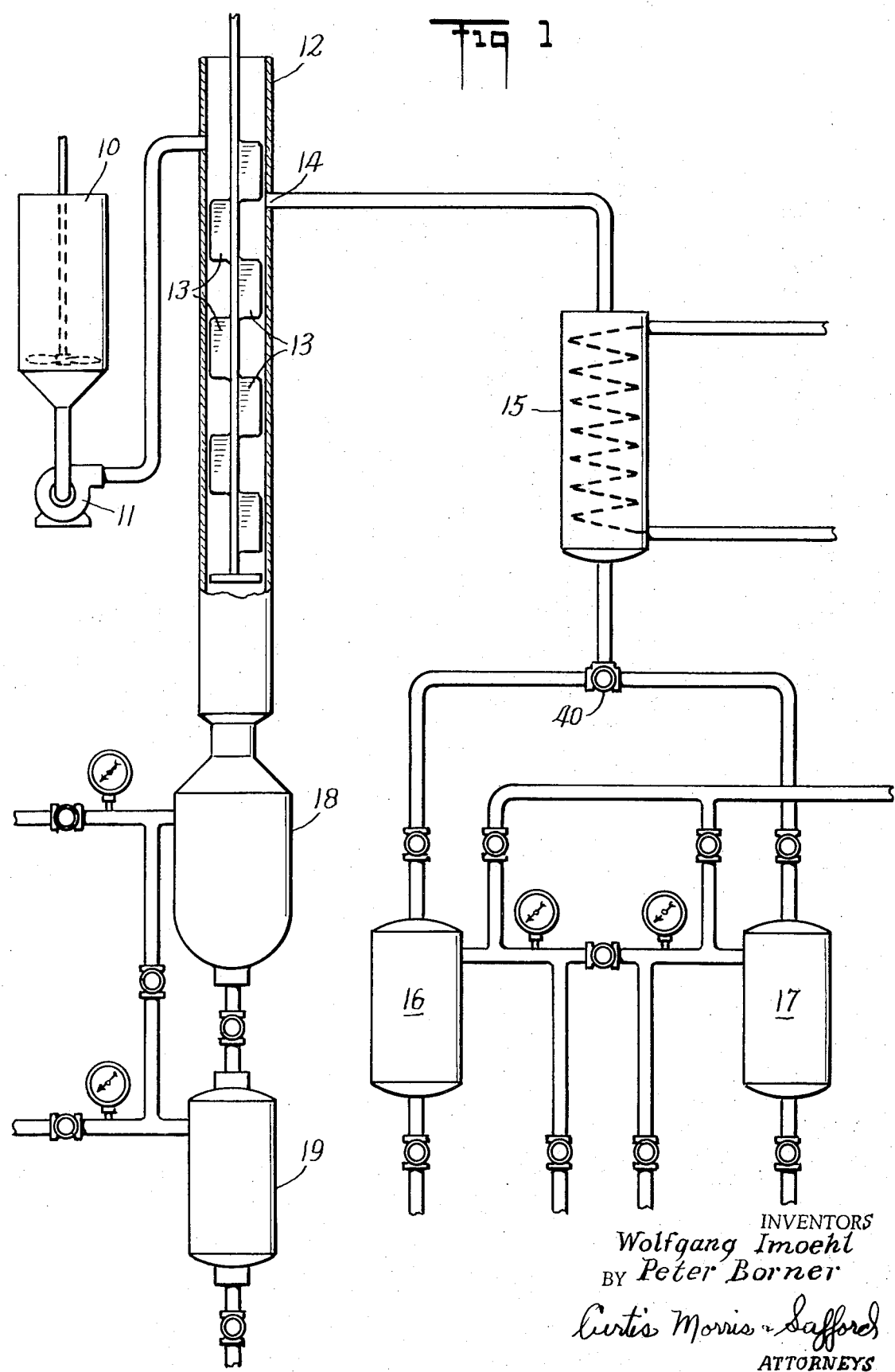

United States Patent [19]

Imohel et al.

[11] 3,728,373

[45] Apr. 17, 1973

[54] METHOD FOR MAKING CYANACRYLIC ACID ESTERS

[75] Inventors: Wolfgang Imohel, Unna; Peter Borner, Altluene, both of Germany

[73] Assignee: Schering AG, Bergkamen/Westfalia, Germany

[22] Filed: May 20, 1971

[21] Appl. No.: 145,242

[30] Foreign Application Priority Data

May 29, 1970 Germany..................P 20 27 502.9

[52] U.S. Cl............260/464, 260/465 D, 260/465.4
[51] Int. Cl....................C07c 121/46, C07c 121/52, C07c/121/30
[58] Field of Search.............260/465 D, 464, 465.4

[56] References Cited

UNITED STATES PATENTS

| 2,721,858 | 10/1955 | Joyner et al. | 260/465.4 X |
| 2,784,215 | 3/1957 | Joyner | 260/465.4 |
| 3,254,111 | 5/1966 | Hawkins et al. | 260/465.4 |
| 3,465,027 | 9/1969 | Hawkins | 260/464 |

*Primary Examiner*—Joseph P. Brust
*Attorney*—Curtis, Morris & Safford

[57] ABSTRACT

A method for making cyanacrylic acid esters by depolymerizing polycyanacrylic acid esters continuously. The polymer, admixed with an inert liquid of high boiling point and a polymerization inhibitor, is depolymerized by heating a thin layer of this mixture — up to 5 centimeters thick — at a temperature from 150° – 250°C. at a pressure of 0.5 – 40 mmHg.

6 Claims, 2 Drawing Figures

METHOD FOR MAKING CYANACRYLIC ACID ESTERS

The present invention relates to an improved method for making cyanacrylic acid esters by the thermal depolymerization of polycyanacrylic acid esters.

It is known in the art that monomeric cyanacrylic acid esters can be prepared by the thermal depolymerization of polycyanacrylic acid esters in the presence of a polymerization inhibitor. As inhibitors, those materials which inhibit both the ionic as well as the free radical polymerization of the monomeric cyanacrylic acid esters are preferably employed. Such substances include, for example, phosphorus (V) oxide, polyphosphoric acids, antimony (V) oxide, picric acid, hydroquinone, t-butyl-pyrocatechol, metaphosphoric acid, maleic acid anhydride, iron (III) chloride, sulfur dioxide, nitrogen dioxide, and hydrogen fluoride. More recently, sultones and anthraquinone disperse dyestuffs have been used.

In the processes heretofore described in the art for depolymerizing polycyanacrylic acid esters, the polymer is heated in a reaction vessel at low pressure in the presence of such a polymerization inhibitor. During the depolymerization, the temperature is slowly and continuously raised until no more monomer product is distilled off. Even for small batches, the process takes a long time.

U. S. Pat. No. 2,756,251 teaches that the depolymerization of polycyanacrylic acid esters in the absence of an inert liquid can only be carried out in batches of at most 100 grams with the production of useful yields. An increase in the size of the depolymerization batch leads to an exceedingly strong decrease in yield. The patent teaches that a certain improvement in the course of the depolymerization can be achieved by the addition of tertiary esters of phosphoric acid. However, the resulting process is still encumbered with a number of problems.

For example, a large amount of tar-like and coke-like residues remains in the depolymerization vessel after decomposition because the decomposition of the polycyanacrylates does not proceed quantitatively. These residues are additionally increased by the amounts of inhibitors, such as phosphorus (V) oxide and hydroquinone, which are present in the depolymerization batch. Thus, it becomes necessary to remove these residues from the depolymerization vessel by thorough cleaning methods after every depolymerization. Because of the great sensitivity of the monomeric cyanacrylic acid esters to impurities, the cleaning of the depolymerization apparatus must be carried out with extreme care. The economy of the entire process is put into question by this expensive work.

A further disadvantage of the conventional preparatory method is the entrapment of non-depolymerized starting product in the depolymerization residues. Also, mixing of the reaction product and even heat transfer are made considerably more difficult by the tar-like residues. Since a uniform temperature cannot be attained in the reaction mixture, it is unavoidable that the entire depolymerization batch may be highly stressed by the influence of the uncontrolled varying temperature. As could be expected, the uniformity, the purity, and, thus, the stability of the products obtained according to the processes of the prior art are subject to considerable variations.

According to the present invention, a process has been found for the preparation of cyanacrylic acid esters by the depolymerization of polycyanacrylic acid esters by heating mixtures of polycyanacrylic acid esters, polymerization inhibitors, and an inert liquid of high boiling point. In the new process, the depolymerization proceeds continuously at temperatures of 150° – 250° C., preferably 180° – 240° C., and in a vacuum of 0.5 – 40 mmHg, preferably 0.5 – 15 mmHg. In the process, the reaction mixture is present in a reaction zone in a layer thickness of up to 5 centimeters, preferably of up to 2 centimeters. The depolymerization residue is continuously removed from the reaction zone and the monomeric cyanacrylic acid esters produced in the form of vapors are collected and condensed, e.g., in a cooled receiver.

The rapidity with which the polymer depolymerizes according to the process of the present invention is surprising. Whereas even small batches of reaction mixture must be heated for a long time at high temperatures according to prior art processes, the depolymerization according to the present invention can be carried out with extremely short reaction times, and with correspondingly lower temperatures in the reaction mixture, with very good yield. The difficulties with heat transfer which occur in the prior art processes are absent in the process of the present invention because the reaction mixture can easily be brought to the desired temperature in the reaction zone.

The uniformity and purity of the end product are significantly improved by the process of the present invention, whereby the stability and the quality of the product is favorably influenced. Also, the economy of the process of the present invention is considerably increased in comparison with the processes of the prior art because the numerous interruptions of the depolymerization for cleaning of the depolymerization apparatus are unnecessary.

As apparatus for carrying out the process of the present invention, all arrangements having a heatable and evacuable reaction zone and which permit a continuous throughput of the reaction mixture in a layer thickness of up to 5 centimeters, with continuous removal of the depolymerization residue, are suitable.

Figure 2:
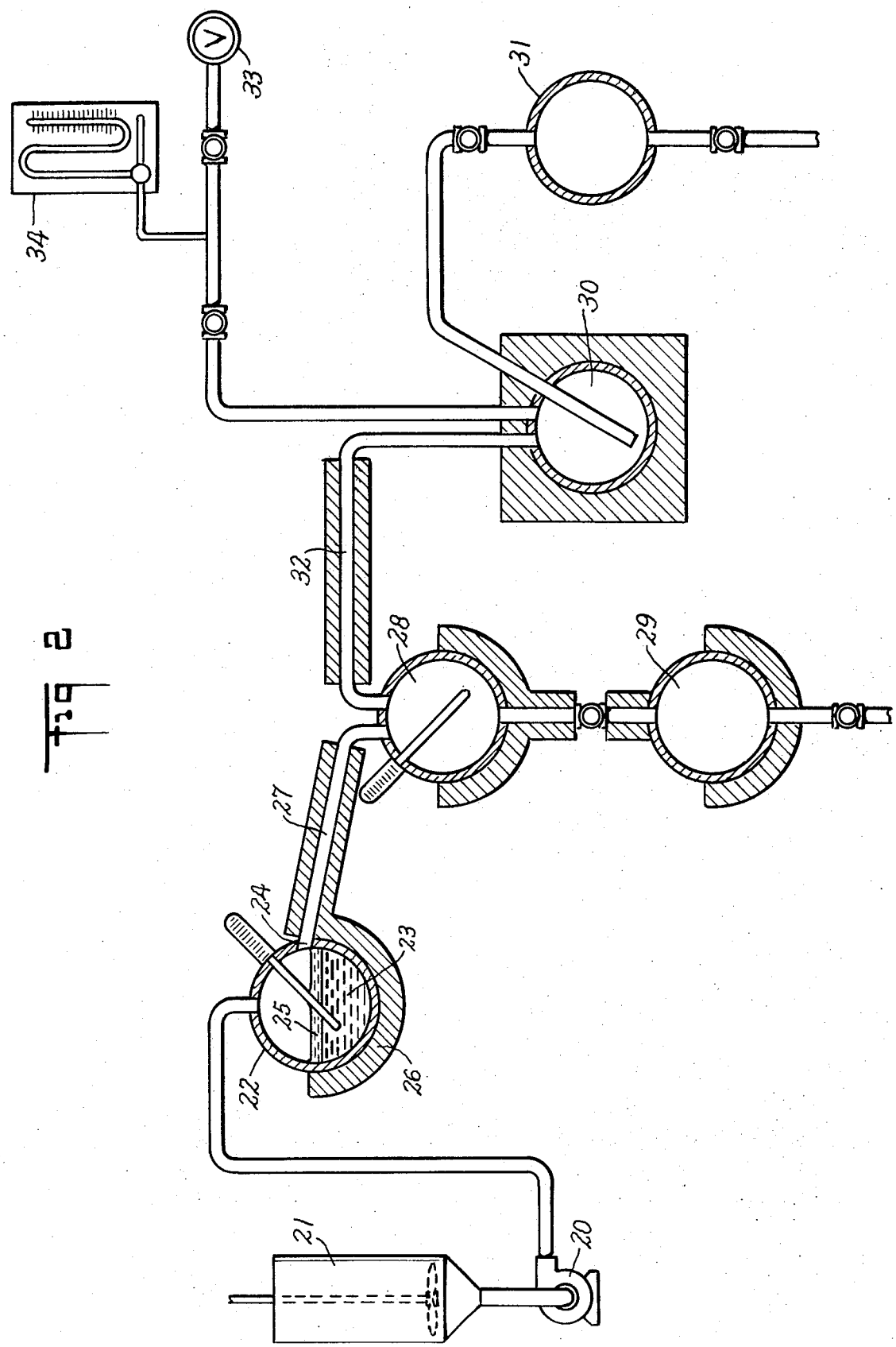

Particularly suitable arrangements are those in the form of a thin-layer evaporator or as an overflow, as shown schematically in FIGS. 1 and 2 of the accompanying drawings. FIG. 1 of the accompanying drawings schematically shows an apparatus comprising storage and mixing vessel 10 containing a reaction mixture such as a dispersion of polycyanacrylic acid esters and inhibitors, for example phosphorus (V) oxide and hydroquinone, in an inert liquid of high boiling point, such as tricresyl phosphate. The dispersion is introduced by means of dosage pump 11 into reaction zone 12, heated to temperatures of from 150° – 250° C., preferably from 180° – 240° C. Rapidly rotating wiper blades 13 uniformly distribute the dispersion over the interior of the reaction vessel in the form of a thin film. The cyanacrylic acid esters released are distilled under a vacuum of 0.5 – 40 mmHg at head 14 of the reaction zone and, after passing through condenser 15, are collected in alternate cooled receivers 16, 17, depending on the position of valve 40. The depolymerization residues flow continuously, together with the inert liquid, into receiver 18, from which they can be removed at any time into draw-off 19 without interruption of the depolymerization.

The overflow apparatus schematically shown in FIG. 2 is constructed of standard laboratory apparatus. By means of a dosage pump 20, a dispersion of a polycyanacrylate, an inhibitor, and an inert high-boiling liquid is introduced from storage and mixing vessel 21 into vessel 22 forming the reaction zone. Vessel 22 is filled with Woods metal 23 to about 1 - 2 centimeters beneath the level of overflow 24, so that only thin layer 25 of the dispersion can collect on the surface of the metal. (In apparatus on a technical scale, the Woods metal could be dispensed with and the same conditions could be obtained by suitably modifying the form of reaction vessel 22.) On the surface of metal 23 which is preferably heated to a temperature of 180° – 240°C. by heating jacket 26, a rapid depolymerization of the polycyanacrylate occurs. Residues formed by the depolymerization are displaced, together with the inert liquid, by newly added material and are lead through heated tube 27 into receiver 28 from which the residue can be removed into draw-off 29, both equipped with heating jackets. Vapors of the monomeric cyanacrylic acid ester formed are condensed in cooled receiver 30 from which they can be removed from time to time into draw-off 31. Connection 32 from receiver 28 to receiver 30 is suitably insulated. Reduced pressure is maintained by vacuum pump 33 and is monitored by manometer 34.

The depolymerization method described above can be used to produce cyanacrylic acid esters of the formula

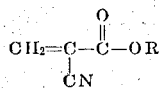

wherein R is a group having from 1 - 16 carbon atoms and is alkyl, halogeno alkyl, alkoxy alkyl, alkenyl, cycloalkyl, or phenyl.

The inhibitors useful in the depolymerization and the inert high boiling liquids are known in the art and are the same as those heretofore used in the art for thermal depolymerization.

A number of methods for the preparation of polycyanacrylic acid esters are known, which methods almost exclusively involve the reaction of cyanacetic acid esters with formaldehyde. Typical methods for preparing the polyesters are disclosed in U. S. Nos. 2,467,927; 2,721,858; and 2,763,677, for instance. Although the preparation of polycyanacrylic acid esters is not an object of the present invention, they can be made, for example, as follows.

In a reaction vessel equipped with a reflux condenser, stirrer, and dropping funnel, 1,038 grams of paraformaldehyde, 3,430 grams of methanol, and 19 grams of piperidine are heated to the boiling temperature of the methanol. Cyanacetic acid methyl ester is then introduced in small portions into the reaction mixture. The heating can then be discontinued, since the reaction is strongly exothermic. After the total amount of cyanacetic acid ester (3,428 g) has been added, the mixture is heated or held at a temperature of about 70° C. for a further 2 hours. Subsequently, the still hot solution is poured into shallow dishes. After a few minutes, polycyanacrylic acid methyl ester precipitates so that the remaining methanol-water mixture can be poured off. After removal of the methanol, the polycyanacrylic acid methyl ester is dried at 70° C. under vacuum until the water content is less than 0.3 percent by weight.

A better understanding of the present invention and of its many advantages will be had by referring to the following specific examples given by way of illustration.

EXAMPLE 1

Using the apparatus shown in FIG. 2, 450 grams per hour of a dispersion comprising 1,700 parts by weight (pbw) of polycyanacrylic acid methyl ester, 42.5 pbw of phosphorus (V) oxide, and 42.5 pbw of hydroquinone in 2465 pbw of tricresyl phosphate are introduced by dosage pump 20 into 4-liter flask 22 containing Woods metal 23. The metal is heated to 220° C. and overflow tube 27 is heated to 200° C. At a vacuum of 3 mmHg, the cyanacrylic acid methyl ester released by the depolymerization is distilled into receiver 30, cooled to −8° C., and can be drawn off into receiver 31 when desired. The depolymerization residues, together with the tricresyl phosphate, run into receiver 28 heated to 200° C. The residues can be removed from time to time into draw-off 29. During the process, a small amount of $SO_2$ is continuously introduced into the apparatus by a capillary (not shown) as a polymerization inhibitor.

After distillation of the crude monomer product, pure cyanacrylic acid methyl ester is obtained in a yield of 150 grams/hour, or 64 percent by weight of the theoretical yield.

EXAMPLE 2

Using the apparatus shown in FIG. 1, 1.8 kilograms per hour of a dispersion comprising 1,700 pbw of polycyanacrylic acid methyl ester, 42.5 pbw of phosphorus (V) oxide, and 42.5 pbw of hydroquinone in 2,465 pbw of tricresyl phosphate are introduced by dosage pump 11 into reaction zone 12 heated to 220° C. and equipped with a rotating wiper. The internal diameter of tubular reaction zone 12 is 50 mm and its length is 1.20 meters. At a vacuum of 7 mmHg, the monomeric cyanacrylic acid methyl ester formed by depolymerization is distilled off and removed through condenser 15 into receivers 16 or 17, depending on the position of the three-way valve 40. Condenser 15, receivers 16 and 17, and all connections between the condenser and the receivers are kept at a temperature of −8° C.

Depolymerization residues, together with the tricresyl phosphate, run together into receiver 18 heated to a temperature of 200° C., from which they can be drawn off at any time without interruption of the depolymerization process into receiver 19. A weak stream of $SO_2$ is introduced into the apparatus as a polymerization inhibitor.

The crude monomer product is removed from receivers 16 or 17 and further distilled. The yield of pure distilled cyanacrylic acid methyl ester is 490 g/hour, or 68 percent by weight of the theoretical yield.

What is claimed is:

1. In a method for making a cyanacrylic acid ester of the formula

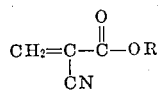

wherein R is a group having from 1 to 16 carbon atoms and is alkyl, halogeno alkyl, alkoxy alkyl, alkenyl, cycloalkyl, or phenyl, by depolymerizing a corresponding polycyanacrylic acid ester, said depolymerization being effected by heating, in a reaction zone, a mixture of said polycyanacrylic acid ester, a polymerization inhibitor, and an inert liquid not boiling under the depolymerization conditions, the improvement which comprises: heating said polycyanacrylic acid ester, polymerization inhibitor and inert liquid at a temperature from 150° to 250° C. and at a pressure of 0.5 to 40 mmHg in a thin layer, up to 5 centimeters thick, whereby said polycyanacrylic acid ester is depolymerized to form vapors of monomeric cyanacrylic acid ester; continuously removing depolymerization residues from the reaction zone; and collecting and condensing said vapors of cyanacrylic acid ester.

2. A method as in claim 1 wherein said mixture is heated at a temperature from 180° – 240° C.

3. A method as in claim 1 wherein said mixture is heated at a pressure of 0.5 – 15 mmHg.

4. A method as in claim 1 wherein said layer is up to 2 centimeters thick.

5. A method as in claim 1 wherein said reaction zone is constructed as a thin-layer evaporator and said mixture is wiped as a thin film on the walls thereof.

6. A method as in claim 1 wherein said mixture is present in said reaction zone in a thin horizontal layer from which said depolymerization residues are removed by overflow.

* * * * *